(12) United States Patent
Damron

(10) Patent No.: US 9,752,438 B1
(45) Date of Patent: Sep. 5, 2017

(54) ENERGY CONVERSION SYSTEM EMPLOYING A CENTRIFUGAL TURBINE TO EXTRACT ENERGY FROM A FLUID FLOW

(71) Applicant: William Thomas Damron, San Jose, CA (US)

(72) Inventor: William Thomas Damron, San Jose, CA (US)

( * ) Notice: Subject to any disclaimer, the term of this patent is extended or adjusted under 35 U.S.C. 154(b) by 0 days.

(21) Appl. No.: 15/393,626

(22) Filed: Dec. 29, 2016

Related U.S. Application Data

(63) Continuation-in-part of application No. 13/780,064, filed on Feb. 28, 2013, now abandoned.

(60) Provisional application No. 61/636,265, filed on Apr. 20, 2012.

(51) Int. Cl.
F01D 1/06 (2006.01)
F03D 1/06 (2006.01)

(52) U.S. Cl.
CPC ............. *F01D 1/06* (2013.01); *F03D 1/0625* (2013.01); *F03D 1/0666* (2013.01)

(58) Field of Classification Search
CPC ...... F03D 1/0625; F03D 1/0666; F03D 9/028; F03D 11/022; F03D 11/028; F04D 29/4226; F04D 29/4213; F04D 29/28; F04D 29/281; F04D 29/30; F04D 29/4206
USPC .......................................................... 415/206
See application file for complete search history.

(56) References Cited

U.S. PATENT DOCUMENTS

| | | | |
|---|---|---|---|
| 219,893 A * | 9/1879 | Babbit | F04D 13/04 417/405 |
| 219,894 A * | 9/1879 | Babbit | F04D 13/04 417/405 |
| 219,895 A * | 9/1879 | Babbit | F04D 13/04 415/186 |
| 510,709 A * | 12/1893 | Reinhardt | F04D 13/04 415/202 |
| 1,298,171 A * | 3/1919 | Burdin | F04D 13/04 4/214 |
| 1,301,387 A * | 4/1919 | Coe | F04D 13/04 415/168.2 |
| 2,321,276 A * | 6/1943 | De Bolt | F04D 29/442 415/143 |
| 3,945,756 A * | 3/1976 | Ikenberry | F04D 1/06 415/66 |
| 5,673,559 A * | 10/1997 | Benson | F01D 9/026 415/144 |
| 7,232,292 B2 * | 6/2007 | Lopatinsky | F02M 37/048 417/423.1 |
| 8,109,727 B2 * | 2/2012 | Barber | F03D 1/0666 416/132 B |

(Continued)

*Primary Examiner* — Theodore Stigell
*Assistant Examiner* — Jon Hoffmann
(74) *Attorney, Agent, or Firm* — Plager Schack LLP

(57) ABSTRACT

An energy system for converting potential and/or kinetic fluid energy into mechanical kinetic energy is provided comprising a housing configured to securely and rotatably support a centrifugal turbine and a energy transmission shaft, the housing comprising a housing fluid inlet and a housing fluid outlet, where the centrifugal turbine comprises relatively light-weight material and a plurality of chambers supported radially around a central hub and configured to function essentially as impellers to rotatably drive the energy transmission shaft upon direction of fluid into the chambers.

8 Claims, 6 Drawing Sheets

(56) References Cited

U.S. PATENT DOCUMENTS

| | | | | |
|---|---|---|---|---|
| 8,222,762 B2* | 7/2012 | Borgen | ................... | B63H 13/00 290/44 |
| 2012/0257971 A1* | 10/2012 | Schmutzer | .............. | F03D 1/025 416/131 |
| 2013/0315732 A1* | 11/2013 | Sutz | ........................ | F03D 1/025 416/9 |
| 2014/0361543 A1* | 12/2014 | Miro | ....................... | F03D 9/002 290/55 |

* cited by examiner

ENERGY CONVERSION SYSTEM EMPLOYING A CENTRIFUGAL TURBINE TO EXTRACT ENERGY FROM A FLUID FLOW

RELATED APPLICATION

This application claims priority to provisional patent application U.S. Ser. No. 61/636,265 filed on Apr. 20, 2012 and Non-provisional application Ser. No. 13/780,064 filed Feb. 28, 2013, the entire contents of which are herein incorporated by reference.

BACKGROUND

The embodiments herein relate generally to systems for converting chemical and/or physical energy from fluids and fuels into mechanical energy, and more particularly to a centrifugal turbine that improves upon the efficiency of prior art systems. Numerous efforts have been made over the decades to find an optimal—i.e., most efficient—method of extracting energy from a compressible fluid or fuel. In many applications, the energy extracted is converted to rotational motion for propulsion systems. Of course other applications are utilized as well.

Present propulsion systems, including piston and rotary engines, and axial turbines, although generally effective, still suffer from inherent inefficiencies, thus requiring substantial amounts of fuel to achieve the desired work output. At least one fundamental design flaw causing such inefficiency is that engines employ too many complex and heavy components that must be moved to convert chemical energy to mechanical energy, wasting a lot of energy through heat loss, the resistance of friction, and the overcoming of inertia of the moving components.

Current designs attempt to improve upon inefficiencies by significantly increasing the volume of the compressible fluids (or fuels) to compensate for this waste of energy. This inherent cost increase applies to reciprocating piston engines and rotary engines, as well as axial turbines that, while more efficient, still must spin at high speeds and use large amounts of fuel to be functionally effective. A need therefore remains for a more efficient conversion of energy in compressible fluids and/or fuels into mechanical energy or other work output.

SUMMARY

In one embodiment, an energy system for converting potential and/or kinetic fluid energy into mechanical kinetic energy comprises a housing configured to securely and rotatably support therein a centrifugal turbine and an energy transmission shaft, the housing comprising a housing fluid inlet and a housing fluid outlet, the centrifugal turbine comprising a plurality of chambers supported radially around a central hub, the chambers comprising a chamber fluid inlet and a chamber fluid outlet, at least some of the chambers comprising, a first wall including a planar surface whose plane passes perpendicularly through the rotatable energy transmission shaft, a second wall including a first curvilinear surface facing inwardly toward the first wall and configured to serve as an impeller to absorb at least some of the energy created by a force of the fluid energy delivered through the housing fluid inlet during operation, and a third wall intersecting with the first wall and the second wall, the third wall including a second curvilinear surface facing inwardly toward the first wall and configured to serve as an impeller to absorb at least some of the energy created by the force of the fluid energy delivered through the housing fluid inlet during operation, and the rotatable energy transmission shaft configured to support the hub of the centrifugal turbine and configured to transmit torque to a discrete assembly to be driven by the torque of the shaft, wherein the energy system is configured to convert the potential and/or kinetic energy of the fluid delivered to the energy system into kinetic energy.

In another embodiment of centrifugal turbine, all of the chambers comprise a first curvilinear wall configured to serve as an impeller to absorb at least some of the energy created by the force of the fluid delivered through the housing fluid inlet during operation. In yet another embodiment, the chambers comprise a first set of chambers positioned at a first nominal distance from the hub, the centrifugal turbine comprises a second set of chambers positioned at a second nominal distance from the hub so as to provide additional surface area to absorb at least some of the energy created by the force of the fluid delivered through the housing fluid inlet during operation. It is contemplated that more than two sets of chambers may be employed as well.

BRIEF DESCRIPTION OF THE FIGURES

The detailed description of some embodiments of the invention will be is made below with reference to the accompanying figures, wherein like numerals represent corresponding parts of the figures.

DETAILED DESCRIPTION OF CERTAIN EMBODIMENTS

In general, embodiments provide an energy conversion system efficiently employing a centrifugal turbine that converts potential and kinetic energy from a pressurized fluid flow into work more efficiently than prior art systems. In one example, the system comprises a centrifugal turbine itself comprising turbine impeller chambers that eliminate drag vortices and provide a sealed, fixed-system, volume to minimize the loss of potential energy due to a pressure or temperature drop of the pressurized fluid caused by an increase in the volume of the combustion/processing chambers. Fluid entering chambers is efficiently used by minimizing forces that are not directly impacting a wall of the chamber that imparts the net torque into the system. For example, a pair of walls which receive fluid and may generate a force that creates a drag on the first wall may be oriented to cancel out the resultant drag forces leaving the fluid to be used optimally. The increased efficiency of such systems allows for a large reduction in the volume of compressible fluid (or fuel) necessary to produce the same power output as current designs because fewer and lighter components are employed, which means much more work can be extracted from the potential and kinetic energy of the fluid.

Figure 2:
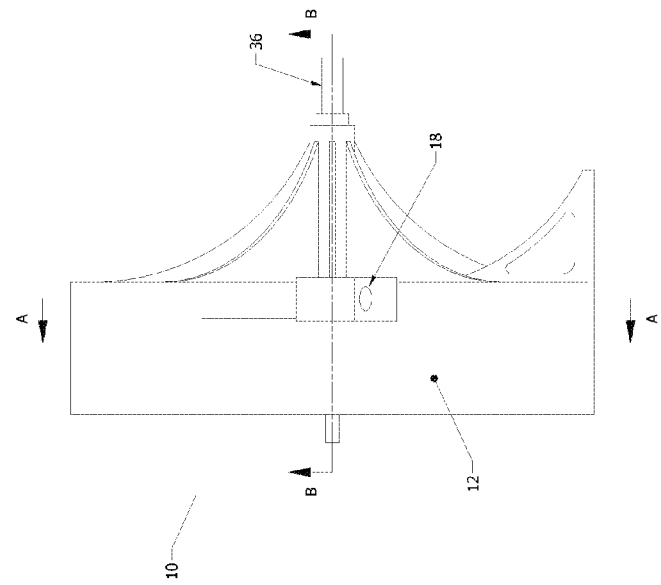
FIG. 2 is side view of the energy system of FIG. 1, showing two orthogonally-positioned cross-sectional lines A-A and B-B.
Figure 1:
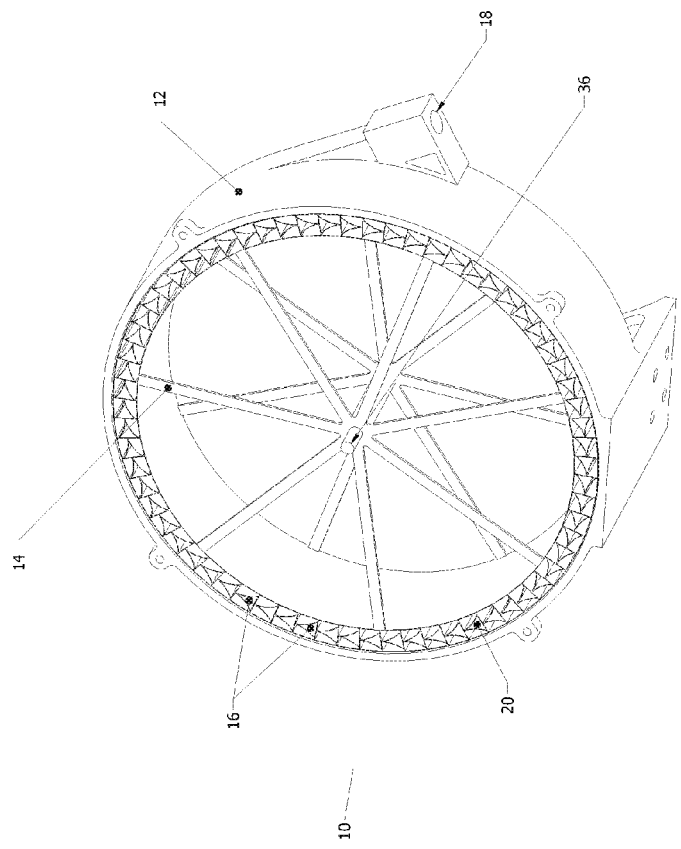
FIG. 1 is a perspective view of an energy producing system according to an exemplary embodiment.

By way of example, and referring to FIGS. 1 and 2, an energy system 10 is shown according to an exemplary embodiment which comprises a housing 12 for rotatably supporting a centrifugal turbine 14 comprising a plurality of chambers 16. The housing 12 comprises at least one fluid inlet 18 within a wall of the housing 12 and at least one fluid outlet 20 within the same or different wall of the housing. The housing fluid inlet 18 and the housing fluid outlet 20 are in different orthogonally-positioned walls. It should be noted that the housing 12 may be configured in any number of possible shapes, and is shown in generally circular shape for schematic purposes only.

Figure 4:
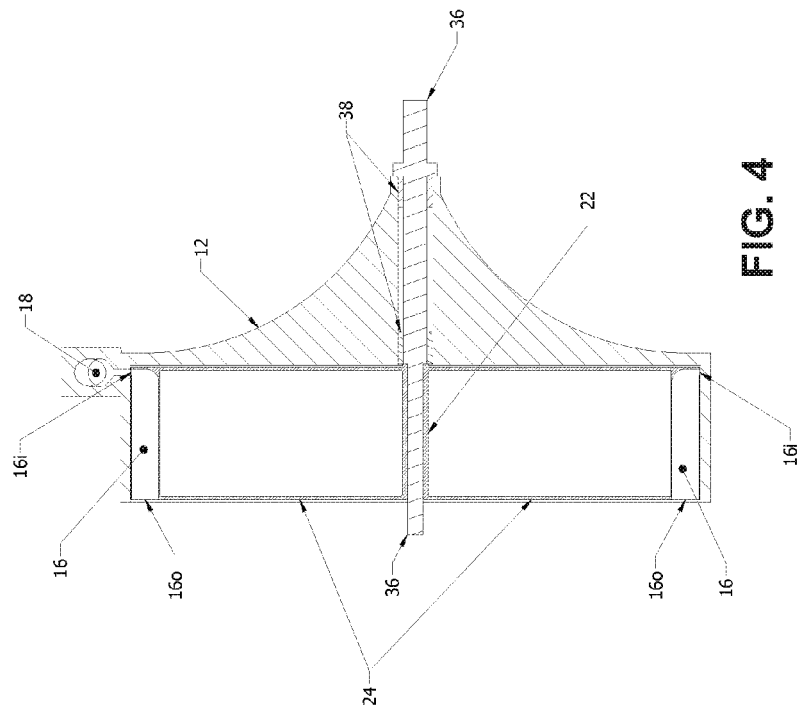
FIG. 4 is a cross-sectional view of the energy system of FIG. 2 taken along line B-B.
Figure 3:
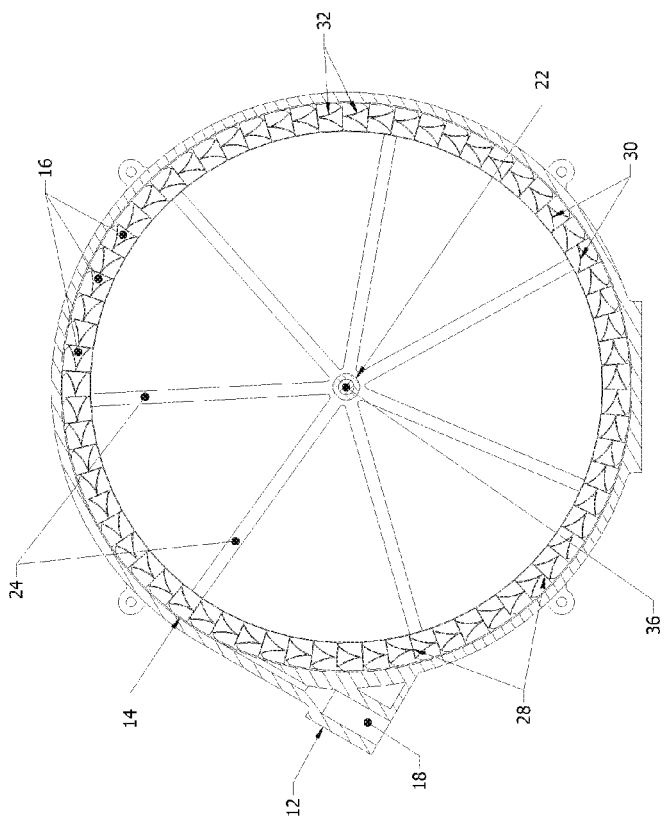
FIG. 3 is a cross-sectional view of the energy system of FIG. 2 taken along line A-A.
Figure 6:
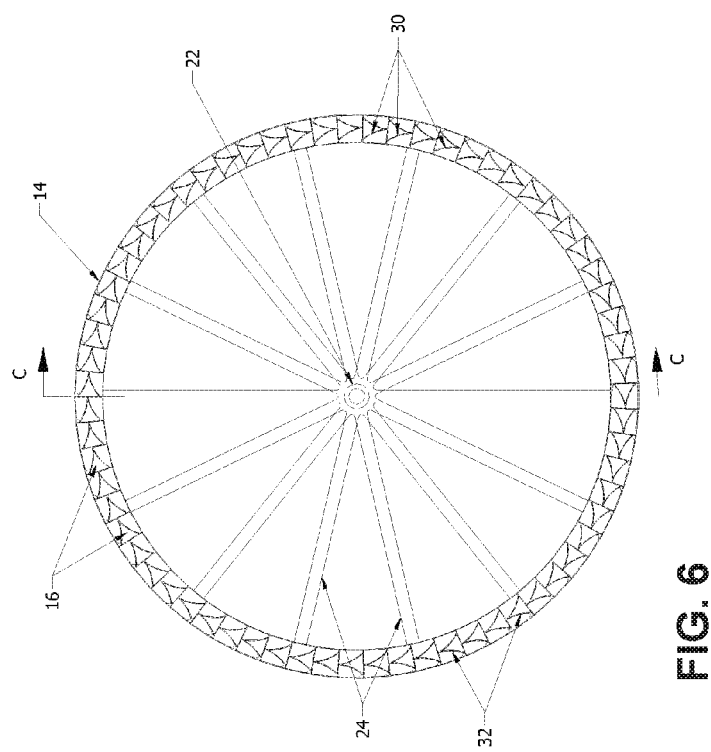
FIG. 6 is a top view of the centrifugal turbine of FIG. 5.
Figure 5:
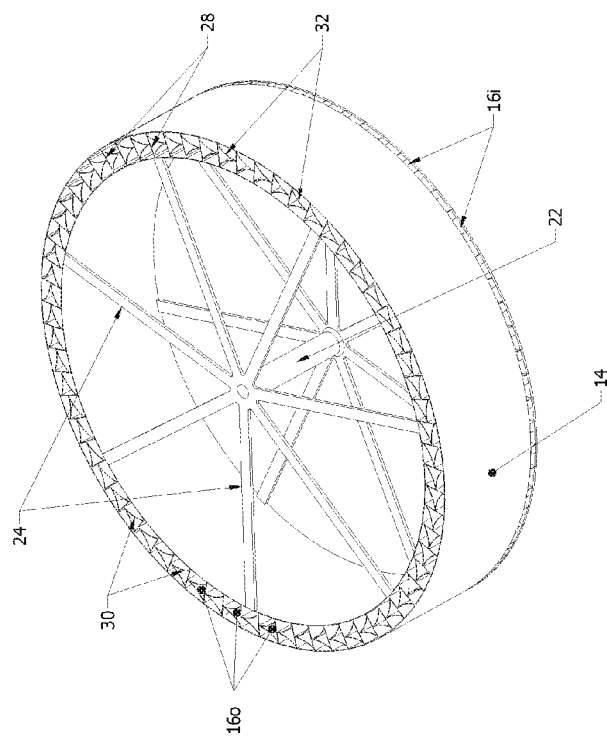
FIG. 5 is a perspective view of a centrifugal turbine for use in an energy system disclosed according to an exemplary embodiment.
Figure 7:
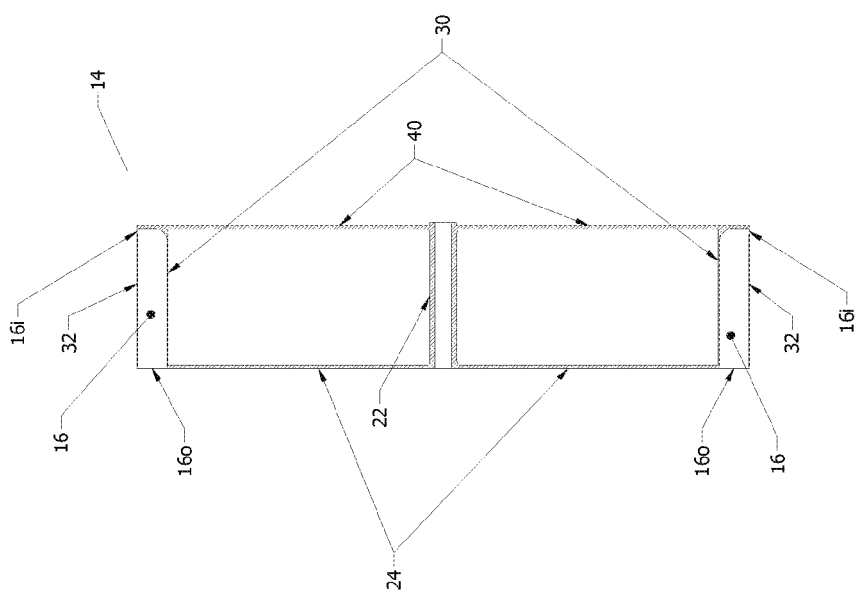
FIG. 7 is a cross-sectional view of the centrifugal turbine of FIG. 5 taken from line C-C.

Referring now to FIGS. 1-7 and 10, a centrifugal turbine 14 is described in more detail. In FIG. 3, which is the cross-section across line A-A from FIG. 1, it can be seen that the centrifugal turbine 14 comprises a plurality of chambers 16 configured radially about the perimeter of the turbine 14 and surrounding a central hub 22, where the chambers are supported in part by a first set of spokes 24. It will be understood however that the spokes 24 may be replaced with other means of radially supporting the chambers 16 in a general peripheral position. As seen in FIGS. 4 and 7, each chamber has a fluid inlet $16_i$ and a chamber outlet $16_o$, each associated respectively with the housing fluid inlet and housing fluid outlet, respectively.

Figure 10:
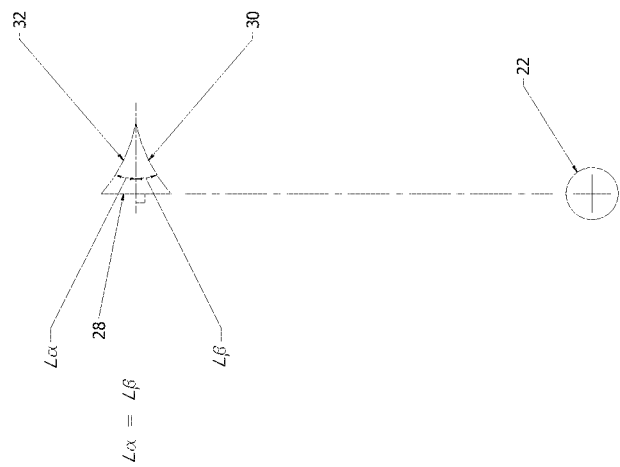
FIG. 10 is a diagrammatic view of an orientation of a turbine chamber relative to the center hub of a turbine according to embodiments disclosed.

The chambers 16 comprise a first wall 28 (sometimes referred to as a forward wall 24) that receives fluid introduced through housing fluid inlet 18. The first wall 28 may extend longitudinally from a first, inlet end of the housing $16_i$ to a second, outlet end of the housing $16_o$. The fluid exerts a force against the forward walls 28, while efficiently permitting the fluid to flow across the surface from the turbine chamber inlet $16_i$ to the turbine chamber outlet $16_o$. The first wall 28 first wall may include a planar surface whose plane passes perpendicularly through the central hub 22 housing a rotatable energy transmission drive shaft 36 (FIG. 10). At least some of the chambers 16 also preferably comprise second wall 30 and a third wall 32. The second wall 30 and third wall 32 may include curvilinear surfaces. The curvilinear surfaces of the second wall 30 and the third wall 32 may intersect each other and the forward wall 28 forming a generally triangular configuration. As such, while not visible in the drawings, it will be understood that the second wall 30 and third wall 32 may also extend from the turbine chamber inlet $16_i$ to the turbine chamber outlet $16_o$. The position of the second wall 30 may be disposed to cancel out forces generated by fluid incident on the third wall 32. In an exemplary embodiment, the second wall 30 and the third wall 32 are concave surfaces facing inwardly toward each other and the forward wall 28. The position and shape of the second wall 30 may mirror the position and shape of the third wall 32 along an axis that is perpendicular to the first wall 28 as diagrammed in FIG. 10. FIG. 10 shows an exemplary embodiment where the angle β created by the intersection of the first wall 28 and second wall 30 is equal to the angle α created by the intersection of the first wall 28 and third wall 32.

In operation it will be appreciated that approximately 100% (if not 100%) of the force generated on the first wall 28 is converted to torque about the axis of the turbine 14. In order to convert the force into torque about the axis of the turbine 14, the force is ideally applied to a plane perpendicular to the axis of the turbine. The first wall 28 is thus positioned planar and perpendicular to the axis of the turbine. The kinetic energy of the compressible fluid is converted into rotational motion about the axis of the turbine as the molecules of the compressible fluid impact the planar forward wall 28. The force of these molecular interactions against the planar forward wall 28 is converted into a torque about the axis of the turbine. The potential energy of the fluid is also converted to mechanical motion as the fluid expands against this planar forward wall 28. This is because the force on a wall from a fluid is defined as pressure times area:

$$F=P*A$$

where F=force; P=pressure; A=area

This force against the planar forward wall 28 also contributes to a torque about the axis of the turbine because the wall is perpendicular to the axis of the turbine. This torque is defined as:

$$T=F*d$$

Where T=torque about the axis; F=force on the planar wall; d=perpendicular distance to the axis.

By having the first wall 28 planar and passing through the axis defined by the central hub 22 and the drive shaft 36, all energy imparted into the wall 28 is converted into mechanical torque out through the drive shaft 36 of the turbine. Curving the two walls 30 and 32 produces each to be an impeller to absorb at least some of the energy created by the force of the fluid energy delivered through the housing fluid inlet. Thus depending on the amount of curvature of each wall 30 and 32 relative to the plane of the forward wall 28, a controllable net force upon the forward wall 28 is achievable. In an exemplary embodiment, mirroring the two curvilinear walls 30 and 32 in an intersection with the forward planar wall 28 allows any forces which do act on the surfaces of walls 30 and 32 to be in opposite directions of each other, the net forces of which effectively cancel each other out. This provides that the large majority of forces produced by the potential and kinetic energy extracted from the fluid act on the planar surface of forward wall 28 and are converted to a torque about the axis of the turbine.

The efficiency of this enclosed chamber design allows the turbine to operate at much lower pressures than a standard piston or rotary (Wenkel) engine. Typically, piston or rotary engines operate with chamber pressures in the range of 500-2000 psi to overcome several sources of wasted energy mentioned previously in their designs. Through testing it has been demonstrated that the centrifugal turbine design of the subject disclosure is efficient enough that it can operate at pressures as low as 35 psi. The combination of a plurality of chambers using the three walls 28, 30, and 32 as described contribute to a torque about the axis of the centrifugal turbine which will allow the turbine to produce equal power output to a piston or rotary engine with significantly less energy input due to its efficiency.

Referring to FIG. 4, the housing 12 preferably rotatably supports the drive shaft 36 via one or more sets of bearings 38. Preferably, the drive shaft 36 is configured to be partially housed at a first end within the hub 22. Connection between the first end of the drive shaft 36 and the turbine hub 22 may be achieved by one or more of numerous methods of mechanical, magnetic and/or chemical adhesion.

Figure 8:
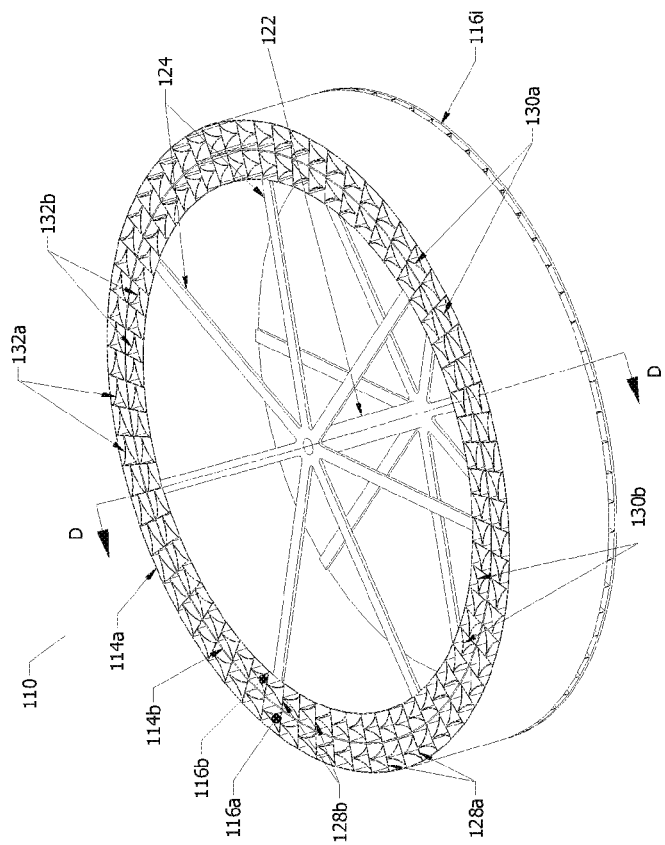
FIG. 8 is a perspective view of another embodiment of a centrifugal turbine for use in an energy system disclosed according to an exemplary embodiment.
Figure 9:
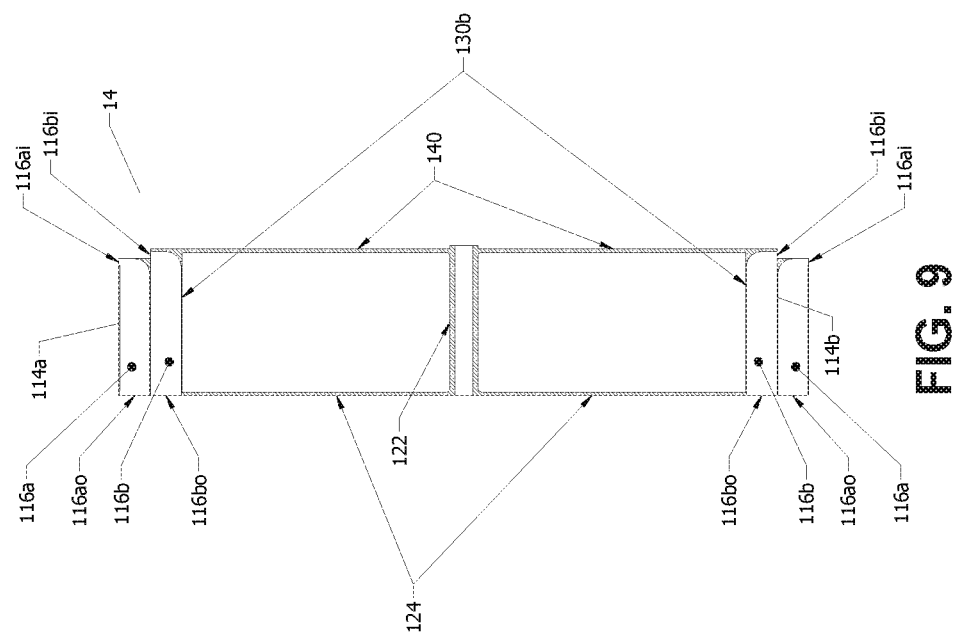
FIG. 9 is a cross-sectional view of the centrifugal turbine of FIG. 8 taken from line D-D.

Referring now to FIGS. 8-9 an energy producing system 110 is shown according to another exemplary embodiment. The embodiment shown in FIGS. 8-9 is similar enough to the embodiment shown in FIGS. 1-7 so that like elements in FIGS. 8-9 are designated using the 100 series of numbers. The energy producing system 110 uses a centrifugal turbine 114 similar to the centrifugal turbine 14 except that chambers 116 (which are the same as chamber 16 described above) may be positioned in concentric rows of chambers (designated as 116a (an outer row) and 116b (an inner row)) around the central hub 122. As will be appreciated, the concentric rows of chambers 116 provide additional surface area against which the fluid may be directed to generate work caused by rotatably driving the drive shaft 36 (omitted from FIGS. 8-9). In that regard, two sets of turbines 114a, 114b may each comprise a set of chambers 116a, 116b, respectively, with one set being radially positioned concentrically with the second set of chambers. In this one example, at least some of the outward set of chambers 116a comprises a forward wall 128a, an inner wall 130a and an outer wall 132a, not unlike the chambers 16 described above.

A second inward set of chambers 116b likewise, although not necessarily, comprises a forward wall 128b, an inner wall 130b and an outer wall 132b. However, as shown in FIG. 9, a cross-section across line D-D of FIG. 8, the radially-inward turbine chambers 116b are longer than their corresponding radially-outward turbine chambers to reveal two sets of chamber fluid inlets 116a$_i$, 116b$_i$, respectively. Each chamber outlet may be flush with each other, as shown, or not be flush depending upon the design choice. A first and second set of struts 124, 140 surround central hub 122 to support the two sets of chambers radially. As will be understood, more than two sets of radially-positioned chambers 116 may be employed within an embodiment of a centrifugal turbine. Indeed, three or more sets of chambers 116 concentrically positioned are contemplated.

In an exemplary embodiment, concentric rows of chambers 116 may be fixed to the central drive shaft. In operation, each concentric row converts energy into rotational motion which is delivered through the central driveshaft. The concentric rows of chambers 116 may work in the same direction (all clockwise or all counterclockwise) to prevent the torque generated from one concentric row acting against another. The plurality of rows generates torque by extracting potential and kinetic energy from a fluid flow, the sum of whose energy contributes to a sum torque about the central axis.

Figure 11:
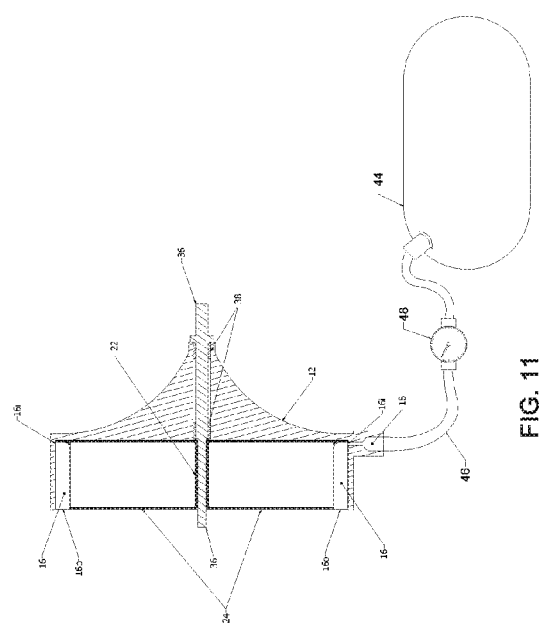
FIG. 11 is a hybrid side view of an energy system including a cross-sectional view of the energy system of FIG. 1 in combination with an example of a fluid supply system where the fluid is imparted with potential and/or kinetic energy to be directed into the energy system embodiment for conversion into mechanical kinetic energy.

The energy systems contemplated herein may be employed in association with a number of possible fluids having potential and/or kinetic energy. For example, and in reference to FIG. 11, a pressurized compressible gas may be supplied to one embodiment of centrifugal turbine energy system. Pressurized gas may be stored in reservoir 44 and directed through supply line 46 into housing fluid inlet 18, and controlled by regulator 48. The fluid system partnered with the embodiments of centrifugal turbine energy systems is shown schematically only by way of example, and the details and conditions contemplated are numerous. Under such circumstances, the regulator 48 may be configured to direct pressurized gas at a controlled velocity so as to deliver fluid having both potential and kinetic energy to be converted into work through drive shaft 36.

Figure 12:
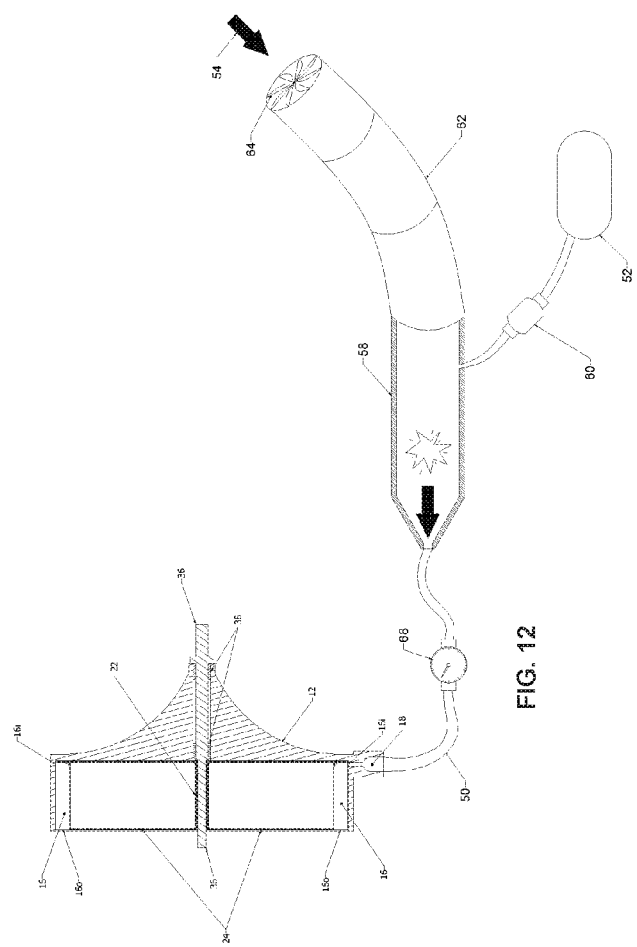
FIG. 12 is a hybrid schematic of the energy system embodiment of FIG. 1 in combination with another example of a fluid supply system where the fluid is imparted with potential and/or kinetic energy to be directed into the energy system embodiment for conversion into mechanical kinetic energy.

In another example, as shown in FIG. 12, fluid delivered through supply line 50 into housing fluid inlet 18 may comprise a fuel source 52 combined with gas (e.g., air) 54 within a combustion chamber 58, where the fuel supply may be controlled and/or directed by pump/regulator 60, and the air 54 is directed into the combustion chamber 58 via supply line 62 powered, if so desired, and by example, a fan 64. The output of the combustion chamber 58 may be controlled by a regulator 68 if so desired. Again, the partnered systems of FIG. 12 are shown and described by example only.

Persons of ordinary skill in the art may appreciate that numerous design configurations may be possible to enjoy the functional benefits of the inventive systems. For example, it is contemplated that for an embodiment of the centrifugal turbine comprising a plurality of sets of radially-positioned chambers, that some of the chambers are served with fuel source and others are served by compressed gas. In other words, various sources of fluids having potential and kinetic energy may be employed to bear against one or more sets of chambers within a single centrifugal turbine. It is also contemplated that while the foregoing was described in the context of the second and third wall shaped and positioned to cancel the forces produced by each other completely out, that some embodiments may not necessarily mirror the second and third wall thus controlling the amount of efficiency imparted onto the forward wall in the turbine to a desired degree. Thus, given the wide variety of configurations and arrangements of embodiments of the present invention the scope of the invention is reflected by the breadth of the claims below rather than narrowed by the embodiments described above.

What is claimed is:

1. An energy system for converting potential and/or kinetic fluid energy into mechanical kinetic energy, the system comprising:

a housing configured to securely and rotatably support therein a centrifugal turbine and an energy transmission shaft, the housing comprising a housing fluid inlet and a housing fluid outlet, the centrifugal turbine comprising a plurality of chambers supported radially around a central hub, the chambers comprising a chamber fluid inlet and a chamber fluid outlet, at least some of the chambers comprising, a first wall including a planar surface, whose plane passes perpendicularly through the rotatable energy transmission shaft, a second wall including a first curvilinear surface facing inwardly toward the first wall and configured to serve as first impeller to absorb at least some of the energy created by a force of the fluid energy delivered through the housing fluid inlet during operation, and a third wall intersecting with the first wall and the second wall, the third wall including a second curvilinear surface facing inwardly toward the first wall and configured to serve as a second impeller to absorb at least some of the energy created by the force of the fluid energy delivered through the housing fluid inlet during operation, and the rotatable energy transmission shaft configured to support the hub of the centrifugal turbine and configured to transmit torque to a discrete assembly to be driven by the torque of the shaft,
wherein the energy system is configured to convert the potential and/or kinetic energy of the fluid delivered to the energy system into kinetic energy.

2. The energy system of claim 1, wherein the third wall also faces inwardly toward the second wall.

3. The energy system of claim 1, wherein the centrifugal turbine chambers comprise a first set of chambers positioned at a first nominal distance from the hub, and wherein the centrifugal turbine comprises a second set of chambers positioned at a second nominal distance from the hub so as to provide additional surface area to absorb at least some of the energy created by the force of the fluid delivered through the housing fluid inlet during operation.

4. The energy system of claim 1, wherein the centrifugal turbine comprises a plurality of rows of radially-positioned, concentric, chambers.

5. The energy system of claim 1, wherein the curvilinear surface of the second wall mirrors the curvilinear surface of the third wall.

6. The energy system of claim 1, wherein the curvilinear surface of the second wall and the curvilinear surface of the third wall are concaved surfaces.

7. The energy system of claim 6, wherein the concave surface of the second wall mirrors the concave surface of the third wall along an axis that is perpendicular to the first wall.

8. The energy system of claim 1, wherein the first wall extends longitudinally from a first, inlet end of the housing to a second, outlet end of the housing, and the second wall and third wall extend longitudinally from the first, inlet end of the housing to the second, outlet end of the housing.

* * * * *